United States Patent
Nandagopalan (10) Patent No.: US 9,019,985 B2
(45) Date of Patent: Apr. 28, 2015

(54) METHOD AND SYSTEM FOR SCHEDULING MULTIPLE CONCURRENT TRANSMISSIONS DURING A CONTENTION ACCESS PERIOD IN A WIRELESS COMMUNICATIONS NETWORK

(75) Inventor: Saishankar Nandagopalan, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 1206 days.

(21) Appl. No.: 12/397,435

(22) Filed: Mar. 4, 2009

(65) Prior Publication Data

US 2010/0226344 A1 Sep. 9, 2010

Related U.S. Application Data

(60) Provisional application No. 61/036,006, filed on Mar. 12, 2008.

(51) Int. Cl.
*H04L 12/413* (2006.01)
*H04W 24/00* (2009.01)
*H04W 36/38* (2009.01)
*H04W 4/02* (2009.01)

(52) U.S. Cl.
CPC ............ *H04W 36/385* (2013.01); *H04W 4/028* (2013.01)

(58) Field of Classification Search
CPC .................. H04W 4/02–4/028; H04W 36/385
See application file for complete search history.

(56) References Cited

U.S. PATENT DOCUMENTS

| | | | |
|---|---|---|---|
| 7,002,938 B2* | 2/2006 | Hester et al. .................. 370/330 |
| 7,333,814 B2* | 2/2008 | Roberts ...................... 455/452.2 |
| 7,369,524 B2* | 5/2008 | Taubenheim et al. ......... 370/328 |
| 7,400,899 B2* | 7/2008 | Shin et al. ..................... 455/522 |
| 7,519,013 B2* | 4/2009 | Destino et al. ................ 370/310 |
| 7,554,965 B2* | 6/2009 | Karaoguz ..................... 370/342 |
| 7,684,380 B2* | 3/2010 | Odman ......................... 370/348 |
| 7,729,329 B2* | 6/2010 | Fujita et al. ................... 370/342 |
| 8,144,670 B2* | 3/2012 | Shin et al. ..................... 370/336 |
| 8,175,613 B2* | 5/2012 | Patil et al. .................. 455/456.1 |
| 2003/0003905 A1* | 1/2003 | Shvodian ...................... 455/423 |
| 2003/0214967 A1* | 11/2003 | Heberling ..................... 370/437 |
| 2007/0286130 A1* | 12/2007 | Shao et al. .................... 370/336 |
| 2008/0144560 A1* | 6/2008 | Jia et al. ........................ 370/312 |
| 2008/0198801 A1* | 8/2008 | Kesselman et al. ........... 370/329 |
| 2009/0109945 A1* | 4/2009 | Lakkis .......................... 370/338 |
| 2009/0109952 A1* | 4/2009 | Lakkis .......................... 370/349 |
| 2009/0109955 A1* | 4/2009 | Lakkis .......................... 370/350 |

(Continued)

*Primary Examiner* — Gregory Sefcheck
(74) *Attorney, Agent, or Firm* — Oblon, McClelland, Maier & Neustadt, L.L.P.

(57) ABSTRACT

Aspects of a method and system for scheduling multiple concurrent transmissions during a contention access period in a wireless communications network are presented. Aspects of the system comprise communicating devices (DEVs) within a piconet that are operable to derive a neighborhood map of a piconet. The neighborhood map information may enable a plurality of DEVs to concurrently transmit signals during a given channel time allocation (CTA) time slot. The ability for multiple DEVs to transmit signals concurrently during a single CTA time slot may increase spectral reuse within a wireless communication medium. In another aspect the system, the neighborhood map information may enable individual DEVs to set clear channel assessment (CCA) thresholds. Individual DEVs may utilize CCA threshold information to determine when to transmit signals to one or more destination DEVs and/or at what rate to transmit data via the signals.

21 Claims, 8 Drawing Sheets

(56) References Cited

U.S. PATENT DOCUMENTS

| | | | |
|---|---|---|---|
| 2009/0232109 A1* | 9/2009 | Nandagopalan et al. | 370/336 |
| 2009/0323587 A1* | 12/2009 | Trachewsky et al. | 370/328 |
| 2010/0220699 A1* | 9/2010 | Gopalakrishnan | 370/338 |
| 2010/0316013 A1* | 12/2010 | Jin et al. | 370/329 |

* cited by examiner

METHOD AND SYSTEM FOR SCHEDULING MULTIPLE CONCURRENT TRANSMISSIONS DURING A CONTENTION ACCESS PERIOD IN A WIRELESS COMMUNICATIONS NETWORK

CROSS-REFERENCE TO RELATED APPLICATIONS/INCORPORATION BY REFERENCE

This application claims priority to U.S. Provisional Application Ser. No. 61/036,006, filed Mar. 12, 2008.

FIELD OF THE INVENTION

Certain embodiments of the invention relate to data communication. More specifically, certain embodiments of the invention relate to a method and system for scheduling multiple concurrent transmissions during a contention access period in a wireless communications network.

BACKGROUND OF THE INVENTION

IEEE 802.15 describes a communication architecture, which may enable communicating devices (DEVs) to communicate via wireless personal area networks (WPANs). Many DEVs utilized in WPANs are small or handheld devices, such as personal digital assistants, portable computers, or consumer electronics devices such as digital video recorders or set top boxes. IEEE 802.15 is a short-range wireless communications standard that enables connection between consumer and computer equipment while eliminating wires. IEEE 802.15 WPAN DEVs may utilize frequencies in the 57 GHz to 66 GHz range for communication.

A plurality of communicating DEVs in a WPAN environment may comprise a network known as a piconet. One of the DEVs in a piconet may function as a piconet coordinator (or controller), or PNC. The PNC may provide overall coordination for the communication between DEVs in a piconet.

Communications between communicating DEVs in a WPAN may occur within time intervals referred to as superframes. The superframe may comprise a plurality of segments. In a first superframe segment, the PNC may transmit one or more beacon frames. The beacon frame may enable recipient DEVs to identify the PNC. Responding DEVs may then establish an association with the PNC. The piconet may comprise the PNC and the associated DEVs.

Radio frequency (RF) communications via the wireless communication medium are typically directional in nature. Thus transmitting DEVs may transmit RF signal energy from a given antenna in a given direction while not transmitting RF signal energy in other directions from the given antenna. Thus, given two potential recipient DEVs located at, for example, equal distances in opposite physical directions relative to a transmitting DEV, a potential recipient DEV which is in the direction of RF signal energy transmission may receive signals from the transmitting DEV while the other potential recipient DEV may not. Given the directional nature of typical RF communication within a piconet, a recipient DEV may determine an angle of arrival (AOA) for a received signal.

A second superframe segment may comprise a contention access period (CAP). During the CAP, communicating DEVs may attempt to gain access to the wireless communication medium before attempting to transmit data. The collision sense multiple access with collision avoidance (CSMA/CA) protocol is typically utilized by communicating devices for wireless medium access. During the CAP, a DEV seeking medium access, an originating DEV, may transmit a request to send (RTS) frame. The RTS frame may be addressed to a destination DEV but the RTS frame may be received by other DEVs. The destination DEV may respond to the RTS frame by transmitting a clear to send (CTS) frame. The originating DEV and destination DEV may subsequently commence communication via the wireless medium. The communications may, for example, involve the transmission of data frames between the originating DEV and the destination DEV. Direct communications between an originating DEV and a destination DEV during the CAP are typically intermittent communications, which comprise relatively short time durations. In accordance with the CSMA/CA protocol, other DEVs that receive the RTS frame transmitted by the originating DEV may refrain from transmitting signals via the wireless medium during these communications. When an originating DEV seeks to reserve access to the wireless medium for longer time durations, the originating DEV may transmit an RTS frame to the PNC during the CAP. The PNC may respond to the originating RTS frame by sending an acknowledgment frame that comprises a time allocation slot.

A third superframe segment may comprise a channel time allocation (CTA) period. The CTA period may comprise one or more CTA time slots. During the CTA period, the PNC may assign and/or schedule a set of CTA time slots to one or more DEVs within the piconet. The PNC may communicate a time allocation slot to an assigned DEV during the CAP that identifies a specific CTA time slot. During the assigned CTA time slot the assigned DEV may be granted reserved access to the wireless communication medium. The assigned DEV may utilize the assigned CTA time slot to engage in communications with one or more destination DEVs. Other DEVs, which are not engaged in communications with the originating DEV, may refrain from transmitting signals via the wireless communication medium during the assigned CTA time slot. In conventional piconet systems, an individual CTA time slot is assigned to a single DEV. Thus, a single DEV may transmit signals via the wireless communication medium during a given CTA time slot.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for scheduling multiple concurrent transmissions during a contention access period in a wireless communications network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for scheduling multiple concurrent transmissions during a contention access period in a wireless communications network. Various embodiments of the invention may comprise a method and system by which communicating devices (DEVS) within a piconet may derive a neighborhood map of the piconet. The neighborhood map information may enable a plurality of DEVs to concurrently transmit signals during a given channel time allocation (CTA) time slot. The ability for multiple DEVs to transmit signals concurrently during a single CTA time slot may increase spectral reuse within the wireless communication medium and thereby increase aggregate data throughput within the piconet. In other aspects of the invention, the neighborhood map information may enable individual DEVs to set clear channel assessment (CCA) thresholds. Individual DEVs may utilize CCA threshold information to determine when to transmit signals to one or more destination DEVs and/or at what rate to transmit data via the signals.

Figure 1:
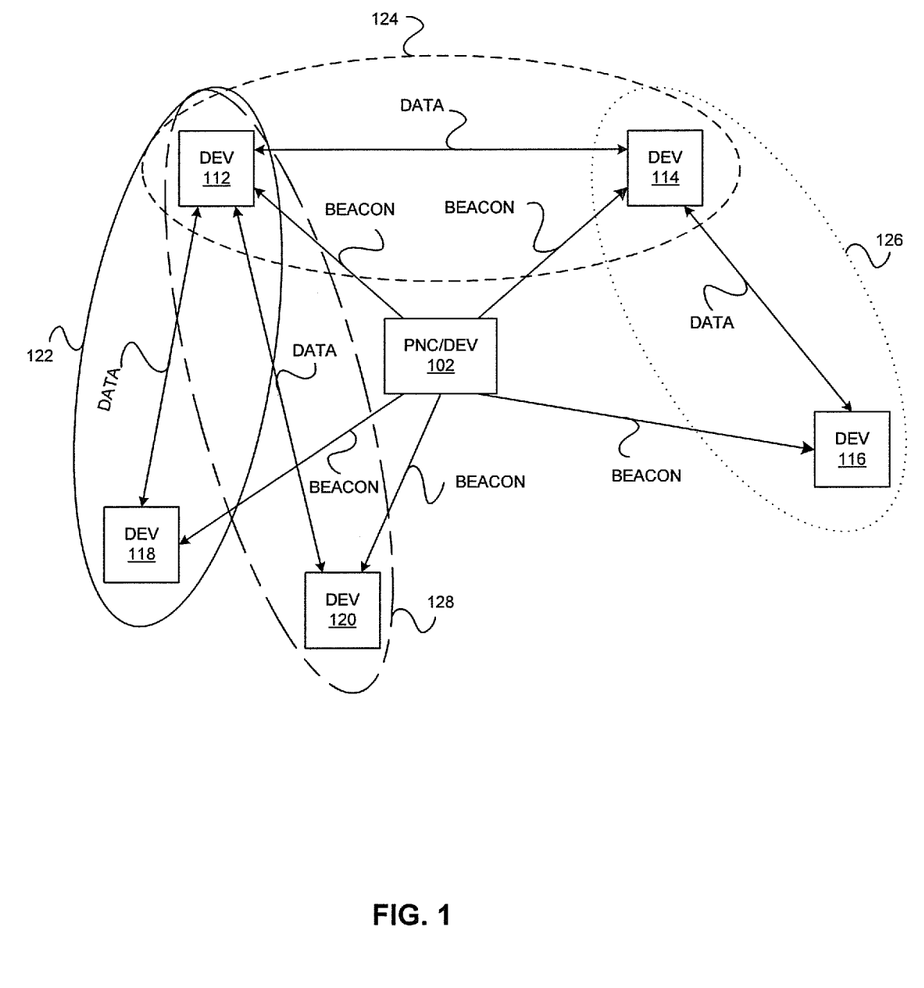
FIG. 1 is an exemplary wireless communication system, which may be utilized in accordance with an embodiment of the invention.

FIG. 1 is an exemplary wireless communication system, which may be utilized in accordance with an embodiment of the invention. Referring to FIG. 1, there is shown an exemplary piconet, which comprises a PNC 102 and a plurality of DEVs 112, 114, 116, 118 and 120. The PNC 102 also comprises DEV functionality. FIG. 1 also shows a plurality of RF coverage areas comprising an RF coverage area 122 for communications between the DEV 112 and the DEV 118, an RF coverage area 128 for communications between the DEV 112 and the DEV 120, an RF coverage area 124 for communications between the DEV 112 and the DEV 114 and an RF coverage area 126 for communications between the DEV 114 and the DEV 116.

The RF coverage area 122 may enable communication of data PDUs (and/or other PDU types) between the DEV 112 and the DEV 118. The RF coverage area 128 may enable communication of data PDUs (and/or other PDU types) between the DEV 112 and the DEV 120. RF coverage area 124 may enable communication of data PDUs and/or other PDU types, between the DEV 112 and the DEV 114. The RF coverage area 126 may enable communication of data PDUs (and/or other PDU types) between the DEV 114 and the DEV 116. The RF coverage areas 122, 124, 126 and 128, represent exemplary RF coverage areas for directional signal transmission. The PNC may communicate beacon frames to each of the DEVs 112, 114, 116, 118 and 120. For simplicity, RF coverage areas for communications between the PNC 102 and each of the DEVs 112, 114, 116, 118 and 120 are not shown in FIG. 1.

Referring to FIG. 1, the DEV 112 may receive signals from the DEV 114, the DEV 120 and the DEV 118. The DEV 114 may receive signals from the DEV 112 and the DEV 116, the DEV 116 may receive signals from the DEV 114, the DEV 118 may receive signals from the DEV 112 and the DEV 120 and the DEV 120 may receive signals from the DEV 112 and the DEV 118. Each of the DEVs 112, 114, 116, 118 and 120 may receive signals from the PNC 102. DEV 112 may derive a neighborhood map based on signals from the DEV 114, the DEV 118, the DEV 120 and the PNC 102. The DEV 114 may derive a neighborhood map based on signals received from the DEV 112, the DEV 116 and the PNC 102. The DEV 116 may derive a neighborhood map based on signals received from the DEV 114 and the PNC 102. The DEV 118 may derive a neighborhood map based on signals received from the DEV 112, the DEV 120 and the PNC 102. The DEV 120 may derive a neighborhood map based on signals received from the DEV 112, The DEV 118 and the PNC 102. The PNC 102 may derive a neighborhood map based on signals received from the DEV 112, the DEV 114, the DEV 116, the DEV 118 and the DEV 120.

The neighborhood map may enable each of the plurality of DEVs to determine the location of other DEVs within the piconet with which the DEV may communicate directly via a wireless communication medium. The region comprising the other DEVs with which a given DEV may communicate may be referred to as an RF coverage area for the given DEV. These other DEVs may be referred to as neighboring DEVs. In FIG. 1, for example, the neighboring DEVs for the DEV 112 are DEV 114, DEV 118, DEV 120 and PNC 102. Location information may be determined based on an angle of arrival (AOA) and/or received signal strength indication (RSSI) for signals received from each neighboring DEV. In FIG. 1, for example, for DEV 112, the AOA for signals received from DEV 114 may be about 0°, the AOA for signals received from the PNC 102 may be about −45°, the AOA for signals received from the DEV 118 may be about −95° and the AOA for signals received from the DEV 120 may be about −85°.

In another aspect of various embodiments of the invention, each of the plurality of DEVs may communicate its neighborhood map to other DEVs and/or to one or more piconet controllers (PNC). In this regard, each DEV may discover the DEVs within the neighborhood of one or more neighbor DEVs. These neighborhoods may be referred to as neighbor DEV neighborhoods. By comparing each of the neighbor DEV neighborhoods to its own neighborhood a given DEV may identify other DEVs which may not be within the RF coverage area of the given DEV. For example, the DEV 112 may communicate its neighborhood map to the DEV 114, the DEV 118, the DEV 120 and the PNC 102. Based on the neighborhood map received from the DEV 112, the DEV 118 may determine that the DEV 114 is a neighbor of the DEV 112 but is outside of the RF coverage area for the DEV 118. Based on the neighborhood map received from the PNC 102, the DEV 118 may determine that D the EV 114 and the DEV 116 are neighbors of the PNC 102 but are outside of the RF coverage area for the DEV 118. Potential destination DEVs, which are outside of the RF coverage area of a transmitting DEV, may be referred to as hidden nodes. In various embodiments of the invention, a given DEV may discover hidden nodes based on received neighborhood maps.

In various exemplary embodiments of the inventions, each DEV may transmit its neighborhood map at specified time instants within a neighbor reporting time (NRT) period within a piconet superframe. The NRT time period may also be referred to as an interference management (IM) time period. An IM time period may be initiated by the PNC based on error rates inferred by the PNC for signal transmissions from piconet DEVs and/or based on reported error rates from one or more piconet DEVs. The specified time instants within the NRT period may be referred to as NRT time slots. The PNC may assign and/or schedule individual NRT time slots to one or more DEVs. Each DEV may transmit its neighborhood map by utilizing omni-directional signal transmission and/or by utilizing directional signal transmission. In various embodiments of the invention that utilize directional signal transmission, one or more directional signals may be concurrently transmitted from any given transmitting DEV.

In another aspect of the invention, the PNC may determine the frequency with which NRT information may be transmitted within a piconet superframe. For example, the PNC may determine that one in every M superframes is to comprise an NRT period. In an exemplary embodiment of the invention, the value, M, which corresponds to the frequency of the NRT reporting within superframes may be communicated by the PNC via beacon frames. The value, M, may be communicated by the PNC to an individual DEV during the process in which the individual DEV establishes an association with the PNC (also referred to as an association phase). In various embodiments of the invention, the PNC may communicate an NRT time slot association to an individual DEV during the association phase for the individual DEV.

In an exemplary embodiment of the invention, the NRT period may occur within the superframe at time instants that are subsequent to the end of the contention access period (CAP) and prior to the beginning of the CTA period. A DEV may transmit its neighborhood map during the CAP and/or during the CTA period. For example, during the CAP or CTA period, a DEV may transmit neighborhood map information prior to transmitting one or more data protocol data units (PDUs), such as frames or packets, and/or the DEV may transmit neighborhood map information subsequent to transmitting one or more data PDUs.

A PNC may utilize the neighbor DEV neighborhood information to assign and/or schedule CTA time slots. In an exemplary aspect of various embodiments of the invention, a PNC may assign and/or schedule CTA time slots such that a plurality of DEVs may transmit signals concurrently within a given CTA time slot. The CTA time slot assignments may be communicated to individual DEVs via acknowledgment frames sent by the PNC in response to RTA frames transmitted by each of the individual DEVs.

In various embodiments of the invention, the PNC may assign and/or schedule CTA time slots such that signal transmissions from each of a plurality of transmitting DEVs are non-interfering. For example a first concurrently transmitting DEV may transmit signals to a first recipient DEV during a given CTA time slot while a second concurrently transmitting DEV is transmitting signals to a second recipient DEV. In this regard, the first recipient DEV may receive a signal from the first concurrently transmitting DEV but may not receive signals transmitted by the second concurrently transmitting DEV. Similarly, the second recipient DEV may receive a signal from the second concurrently transmitting DEV but may not receive signals transmitted by the first concurrently transmitting DEV.

Figure 2:
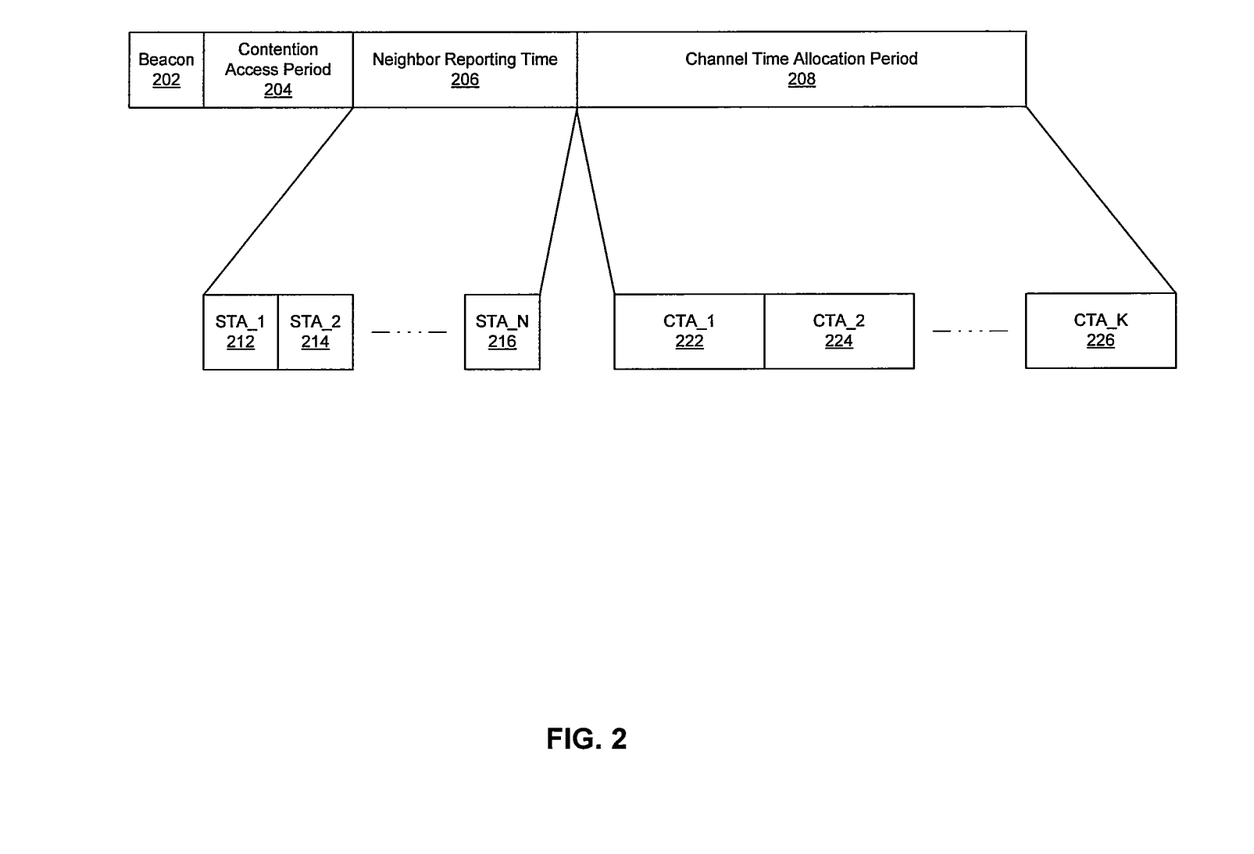
FIG. 2 is a diagram of an exemplary superframe, in accordance with an embodiment of the invention.

FIG. 2 is a diagram of an exemplary superframe, in accordance with an embodiment of the invention. Referring to FIG. 2, there is shown a beacon frame 202, a contention access period (CAP) 204, a neighbor reporting time (NRT) 206 and a channel time allocation (CTA) period 208. The beacon frame 202 may be transmitted from the PNC 102 to each of the DEVs 112, 114, 116, 118 and 120 and may enable the DEVs 112, 114, 116, 118 and/or 120 to establish an association with the PNC 102. The CAP 204 is utilized substantially described above.

The NRT 206 comprises a plurality of NRT time slots 212, 214, ..., and 216. Any given one of the NRT time slots 212, 214, ..., and 216 may be assigned by the PNC 102 to one of the DEVs 112, 114, 116, 118 and/or 120. A given DEV may transmit neighborhood information to the PNC 102 and/or other DEVs during the assigned NRT time slot. For example, in an exemplary embodiment of the invention, the DEV 112 may be assigned NRT time slot 212. In an exemplary embodiment of the invention, the PNC 102 may communicate the NRT time slot 212 assignment to DEV 112 during the association phase for DEV 112.

During NRT time slot 212, DEV 112 may transmit neighborhood information. The neighborhood information may be transmitted by utilizing omni directional signal transmission and/or by utilizing one or more directional signal transmissions. The omni directional signal transmission may occur concurrently or sequentially. In an exemplary embodiment of the invention, an adaptively steerable antenna located at the DEV 112 may be reoriented for each of the sequence of directional signal transmissions. In another exemplary embodiment of the invention, the DEV 112 may utilize a plurality of directional antennas, which may be utilized to concurrently transmit signals.

The CTA period 208 comprises a plurality of CTA time slots 222, 224, ..., and 226. In various embodiments of the invention, one or more of the DEVs 112, 114, 116, 118 and/or 120 may transmit signals during a given CTA time slot. For example, in an exemplary instance in which, during the CAP, the DEV 112 sends an RTS frame to the PNC 102 requesting to communicate with DEV 118 during the CTA period and DEV 114 sends an RTS frame to the PNC 102 requesting to communicate with the DEV 116 during the CTA period, the PNC 102 may assign both communications to CTA time slot 222. Thus, in an exemplary embodiment of the invention, the DEV 112 and the DEV 118 may communicate concurrently with communication between the DEV 114 and the DEV 116.

An originating DEV, which attempts to transmit data PDUs during the CAP may have to contend with concurrent transmissions from other DEVs, referred to as contending DEVs, which are also attempting to access and/or communicate via the wireless communication medium. For example, an originating DEV 118 may attempt to access the wireless communication medium to initiate a communication with the destination DEV 112 while the DEV 120 may also be attempting to access the wireless communication medium to establish a communication with DEV 112. The signals received at DEV 118 from DEV 120 may interfere with signals received at DEV 118 from DEV 112. As a result, DEV 118 may not be able to successfully receive data transmitted by either DEV 112 or DEV 120.

In various embodiments of the invention, the originating DEV, for example the DEV 112, may transmit a request to send (RTS) frame, which identifies a destination DEV, for example the DEV 118. Prior to responding to a received RTS, the destination DEV may select a data transfer rate (Rate_R) to be utilized by the originating DEV for transmission of data PDUs via the wireless communication medium. An initial Rate_R value may be determined based on information in the received RTS frame. Based on the selected Rate_R, the destination DEV may determine a signal to noise ratio (SNR) statistic at which the transmitted signals should be received at the destination DEV(s). This SNR statistic may be referred to as a threshold SNR value for Rate_R. Based on its own neighborhood information, the destination DEV(s) may determine an SNR statistic for signals transmitted by the originating DEV and received by the destination DEV. This SNR statistic may be referred to as a received SNR value. Based on the received SNR value and the threshold SNR value, the destination DEV may compute an interference margin value. The interference margin value may be represented as shown in the following equation:

$$\gamma = SNR_{Received} - SNR_{Threshold\_for\_Rate\_R} \quad [1]$$

where $\gamma$ refers to the interference margin value, $SNR_{Received}$ refers to the received SNR value and $SNR_{Threshold\_for\_Rate\_R}$ refers to the SNR for data transmission at Rate_R.

In an exemplary embodiment of the invention, a destination DEV 112 that has received an RTS frame from an originating DEV 118 may determine an SNR for received signals from DEV 118 by computing an RSSI value for signals received from DEV 112. DEV 118 may determine an SNR value for Rate_R signal transmission based on a reference table of SNR values as a function of transmission data rate, for example. In various embodiments of the invention the reference table may comprise values that are computed based on empirical observation and/or based on information contained specification document(s), for example IEEE 802 standard document(s).

Also based on, its own neighborhood information the destination DEV(s) may determine an aggregate of interference signal energy levels, which may be received from other neighboring DEVs. The aggregate of interference signal energy levels may be determined based on direction transmission and reception of signals from the originating DEV to the destination DEV. The direction of transmission may be determined at a destination DEV based on its own neighborhood information. In an exemplary embodiment of the invention, the direction of transmission is an AOA value associated with directional transmission of signals from the originating DEV to the destination DEV. In an exemplary embodiment of the invention, interference margin value(s) and/or the aggregate of interference signal energy levels may be determined based on computation(s).

Referring to FIG. 1, for example, the DEV 112 may determine that the direction of transmission and/or reception of signals between the DEV 112 and the DEV 118 is substantially equal to the direction of transmission and/or reception of signals between the DEV 112 and the DEV 120. This direction of transmission and/or reception may be referred to as the $AOA_{118}$ direction. In this regard, signal energy received in the $AOA_{118}$ direction from DEV 120 may significantly interfere with signal energy received from DEV 118. The DEV 112 may compute the aggregate of interference signal energy levels, which may interfere with signal reception from the DEV 118 in the $AOA_{118}$ direction based on a computed RSSI for signals received from the DEV 120, the DEV 114, the PNC 102, and the DEV 116. In the $AOA_{118}$ direction, interfering signal energy from the DEV 114, the PNC 102 and the DEV 116 may be comparatively small. Thus, the dominant source of signal interference in the $AOA_{118}$ direction for signal reception from the DEV 118 may signal energy from the DEV 120. The DEV 112 may compare the computed aggregate of interference signal energy levels in the $AOA_{18}$ direction with the interference margin for signals received from DEV 118.

Based on the computed aggregate interference signal energy levels and the interference margin value(s), the destination DEV may determine whether to accept the current selected data rate, select a higher data rate or select a lower data rate. In various embodiments of the invention, the destination DEV may select a data rate such that the interference margin value is greater than or equal to the computed aggregate interference signal energy level. For example, referring to FIG. 1, the DEV 118 may select a data rate such that the computed aggregate of interference signal energy levels in the $AOA_{118}$ direction is less than the interference margin for signals received from the DEV 118. In an exemplary embodiment of the invention, a lower Rate_R value may correspond to a lower $SNR_{Threshold\_for\_Rate\_R}$ value, which in turn may result in a larger interference margin value $\gamma$.

In various embodiments of the invention, the destination DEV may communicate the selected data rate to the originating DEV via a clear to send (CTS) frame. In one aspect of various exemplary embodiments of the invention, the destination DEV may transmit the CTS frame by utilizing selected frequencies within the RF frequency bandwidth for an RF communication channel utilized by the destination DEV for transmission of signals within the piconet. For example, in an exemplary piconet, the RF frequency bandwidth may be 20 MHz. Within that 20 MHz bandwidth a plurality of frequency carrier signals, distributed across a plurality of frequencies (for example 56 frequencies), may be concurrently utilized for transmitting signals. In an exemplary embodiment of the invention, the group of concurrently transmitted frequency carriers within an RF frequency bandwidth may be referred to as an orthogonal frequency division multiplexing (OFDM) RF signal. The OFDM RF signal may propagate from a transmitting DEV to a receiving DEV via an RF channel.

In an exemplary embodiment of the invention, the frequencies utilized for transmission of the CTS frame(s) may be selected such that the frequency distance between selected frequencies exceeds the coherence bandwidth for the RF channel between the destination DEV and the originating DEV. The coherence bandwidth may refer to the range of frequencies for which signal distortion, or fading, is approximately constant. This characteristic may also be referred to as flat fading. By transmitting the CTS frame via a plurality of frequencies separated by greater than the coherence bandwidth, a destination DEV may increase the likelihood that the CTS will be received by the originating DEV over at least one of the frequencies utilized for CTS transmission.

Referring to FIG. 1, in an exemplary embodiment of the invention, the DEV 112 may compute one or more channel estimates for an RF channel between the DEV 112 and the DEV 118. This RF channel may be referred to as $RF_{118}$. The channel estimates for $RF_{118}$ may be computed based on signals received from the DEV 118 and/or based on feedback information received from the DEV 118. Based on the computed channel estimates, the DEV 112 may determine a coherence bandwidth for signals transmitted via the RF channel $RF_{118}$. This coherence bandwidth may be referred to as $cb_{118}$. The DEV 112 may respond to a RTS frame received from the DEV 118 by transmitting a CTS frame to the DEV 118. The CTS frame may be transmitted by the DEV 112 utilizing a set of carrier frequencies, $fc_1$, $fc_2$ and $fc_3$, within the channel bandwidth for $RF_{18}$, for example. The relation ships between carrier frequencies $fc_1$, $fc_2$ and $fc_3$ may be represented as shown below:

$$fc_1 < fc_2 < fc_3;$$

$$fc_2 - fc_1 > cb_{118}; \text{ and}$$

$$fc_3 - fc_2 > cb_{118} \qquad [2]$$

Upon receipt of the CTS frame from the destination DEV, the originating DEV may either transmit one or more data PDUs to the destination DEV at the data rate specified within the CTS frame or the originating DEV may not transmit one or more data PDUs to the destination DEV during the CAP. In the latter case, the originating DEV may wait until the assigned CTA time slot to transmit the data PDUs. Referring to FIG. 1, in an exemplary embodiment of the invention, upon receipt of the CTS from the DEV 112, the DEV 118 may determine that there is sufficient interference margin to transmit signals to the DEV 112 during the CAP at a desired data rate, Rate_R. In such case, the DEV 118 may transmit data to the DEV 112 during the CAP. Alternatively, the DEV 118 may determine that there is insufficient interference margin to transmit signals to the DEV 112 during the CAP. In such case, the DEV 118 may wait until its assigned CTA time slot to transmit signals to the DEV 112.

At a PNC, the neighborhood information received from each of the DEVs may be utilized to determine data rates to be utilized by communicating DEVs during their respective CTA time slots. The PNC may compute interference margins and/or aggregate interference signal energy levels for each of the DEVs in the piconet. Based on these computations, the PNC may determine the data rate to be utilized by each of the transmitting DEVs during their respective CTA time slots. In addition, the PNC may determine the number of concurrently transmitting DEVs may be allowed during a given CTA time slot.

In various embodiments of the invention, the set of CTA time slot assignments generated by the PNC may be referred to as a scheduling matrix. Referring to FIG. 1, in an exemplary embodiment of the invention, the PNC 102 may compute a scheduling matrix based on PDUs comprising neighborhood information received from the DEVs 112, 114, 116, 118 and/or 120. The scheduling matrix may be computed based on PDUs received by the PNC 102 during a CAP in a current superframe and/or based oh PDUs received during CAPs in one or more preceding superframes.

In an exemplary embodiment of the invention, the PNC 102 may receive reported RSSI information in the neighborhood information received from each of the DEVs 112, 114, 116, 118 and/or 120. The RSSI information may indicate a measured RSSI value for signals received by the reporting DEV from each of the neighbor DEVs. The PNC 102 may utilize the reported RSSI information to compute interference margins for each reporting DEV. The PNC 102 may compute a distinct interference margin for each neighbor DEV to the reporting DEV. For example, the PNC 102 may compute interference margins for the DEV 112 for signals received from the DEV 114, the DEV 118 and/or the DEV 120, respectively. The PNC 102 may utilize observed RSSI values for signals received at the PNC 102 for each reporting DEV when computing interference margins.

Based on the computed interference margins, the PNC may assign individual CTA time slots to one or more DEVs. For example, the PNC 102 may assign CTA time slot 222 for concurrent communications between the DEV 112 and/or the DEV 118 and the DEV 114 and/or the DEV 116 while assigning CTA time slot 224 to concurrent communications between the DEV 112 and/or the DEV 114 and the DEV 118 and/or the DEV 120.

Based on received neighborhood information, a PNC may generate a neighborhood data set. The neighborhood data set may be based on neighborhood information received from the reporting DEVs within the piconet. The neighborhood data set may comprise: an AOA value for each reporting DEV in the piconet; a reference angle, which may be utilized by the PNC to compute each AOA value; a neighbor DEV neighborhood for each reporting DEV in the piconet; an RSSI value for signals received from each reporting DEV in the piconet; and the scheduling matrix computed by the PNC. Referring to FIG. 1, the PNC 102 may determine a reference angle $\theta_{102}$. The PNC 102 may determine a direction of reception for signals received from DEVs 112, 114, 116, 118 and/or 120. The PNC 102 may determine an AOA value based on each respective direction of signal reception relative to $\theta_{102}$.

Figure 3:
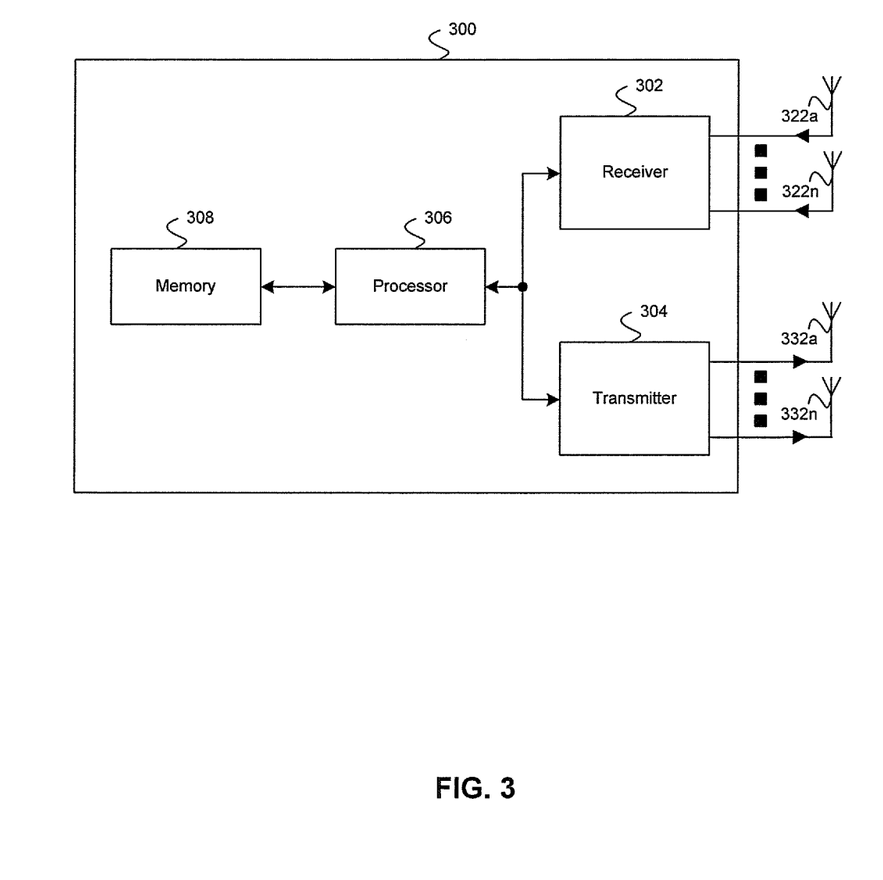
FIG. 3 is an exemplary transceiver comprising a plurality of transmitting antennas and a plurality of receiving antennas, which may be utilized in connection with an embodiment of the invention.

FIG. 3 is an exemplary transceiver comprising a plurality of transmitting antennas and a plurality of receiving antennas, which may be utilized in connection with an embodiment of the invention. Referring to FIG. 3, there is shown a transceiver system 300, a plurality of receiving antennas $322a, \ldots, 322n$ and a plurality of transmitting antennas $332a, \ldots, 332n$. The transceiver system 300 may be exemplary of the PNC 102 and/or of any of the DEVs 112, 114, 116 and/or 118. The transceiver system 300 may comprise at least a receiver 302, a transmitter 304, a processor 306, and a memory 308. Although a transceiver is shown in FIG. 3, transmit and receive functions may be separately implemented.

The receiver 302 may perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via one or more receiving antennas $322a, \ldots, 322n$. The data may be communicated to the processor 306.

The transmitter 304 may perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data may be received from the processor 306. The RF signals may be transmitted via one or more transmitting antennas $332a, \ldots, 332n$.

In various embodiments of the invention, one or more of the receiving antennas $322a, \ldots, 322n$ may be operable for directional and/or omni-directional reception of signals. One or more of the transmitting antennas $332a, \ldots, 332n$ may be operable for directional and/or omni-directional transmission of signals.

The memory 308 may comprise suitable logic, circuitry and/or code that may enable storage and/or retrieval of data and/or code. The memory 308 may utilize any of a plurality of storage medium technologies, such as volatile memory, for example random access memory (RAM), and/or non-volatile memory, for example electrically erasable programmable read only memory (EEPROM). In the context of the present application, the memory 308 may enable storage of code for the computation and storage of AOA values, RSSI information, SNR values, interference signal energy levels, interference margins, scheduling matrices and/or other neighborhood information, for example.

In operation, the processor 206 may enable the computation of the AOA values, RSSI information, SNR values, interference signal energy levels, interference margins, scheduling matrices and/or other neighborhood information, for example. The processor 206 may also enable the transmission and processing of RTS frames, CTS frames, data frames comprising neighborhood information and/or the transmission and processing of other PDUs transmitted by the transceiver 300.

Figure 4A:
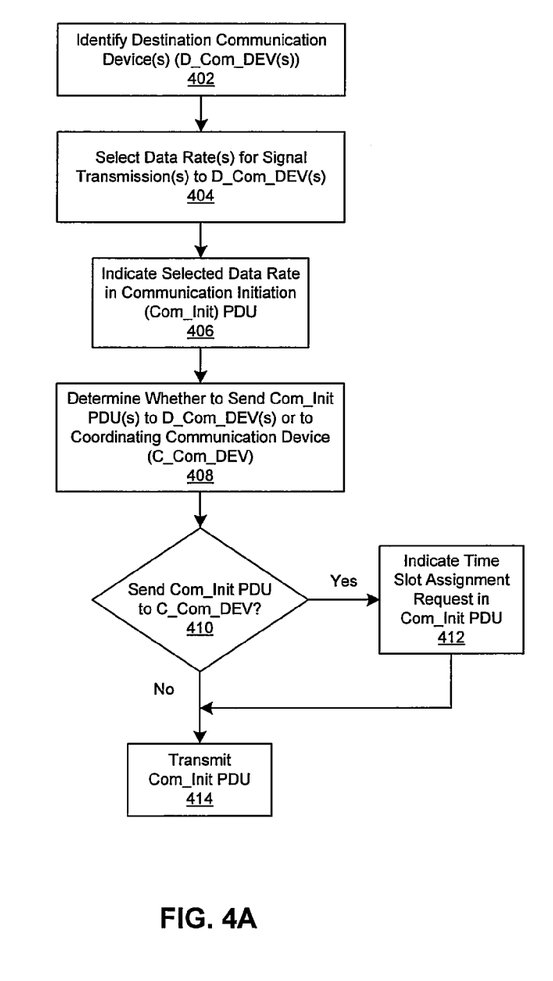
FIG. 4A is a flowchart that illustrates exemplary steps for an originating communicating device that attempts to transmit data to one or more destination communicating devices, in accordance with an embodiment of the invention.

FIG. 4A is a flowchart that illustrates exemplary steps for an originating communicating device that attempts to transmit data to one or more destination communicating devices, in accordance with an embodiment of the invention. Referring to FIG. 4A, in step 402, an originating communication device (Com_DEV) may identify one or more destination communicating devices (D_Com_DEV(s)) which are the intended destination(s) for PDUs to be communicated via transmitted signals. For example, with reference to FIG. 1, an exemplary originating Com_DEV is DEV 118 and an exemplary D_Com_DEV is DEV 112. In an exemplary embodiment of the invention, DEV 118 may communicate data PDUs via transmitted signals that may be received by DEV 112. In various embodiments of the invention, the originating Com_DEV may concurrently communicate PDUs to a plurality of D_Com_DEVs via broadcast and/or multicast transmission. In an exemplary embodiment of the invention, DEV 118 may multicast PDUs to DEV 112 and DEV 120.

In step 404, the originating Com_DEV may select one or more data rates for communication of PDUs via the signals transmitted to the D_Com_DEV(s). In step 406, the originating Com_DEV may indicate the selected data rate in one or more communication initiation (Com_Init) PDUs. In an exemplary embodiment of the invention, a Com_Init PDU may comprise an RTS frame. In step 408, the originating Com_DEV may determine whether to send the Com_Init PDU(s) to the D_Com_DEV(s) or to a coordinating Com_DEV (C_Com_DEV). With reference to FIG. 1, an exemplary C_Com_DEV is PNC 102.

In step 410, when the originating Com_DEV sends the Com_Init PDU to the C_Com_DEV, in step 412, the originating Com_DEV may indicate a time slot assignment request in the Com_Init PDU(s). In step 414, the originating Com_DEV may transmit the Com_Init PDU(s) with the included time slot request. In step, 410, when the originating Com_DEV does not send the Com_Init PDU to the C_Com_DEV, in step 414, the originating Com_DEV may transmit the Com_Init PDU(s) without including a time slot request.

Figure 4B:
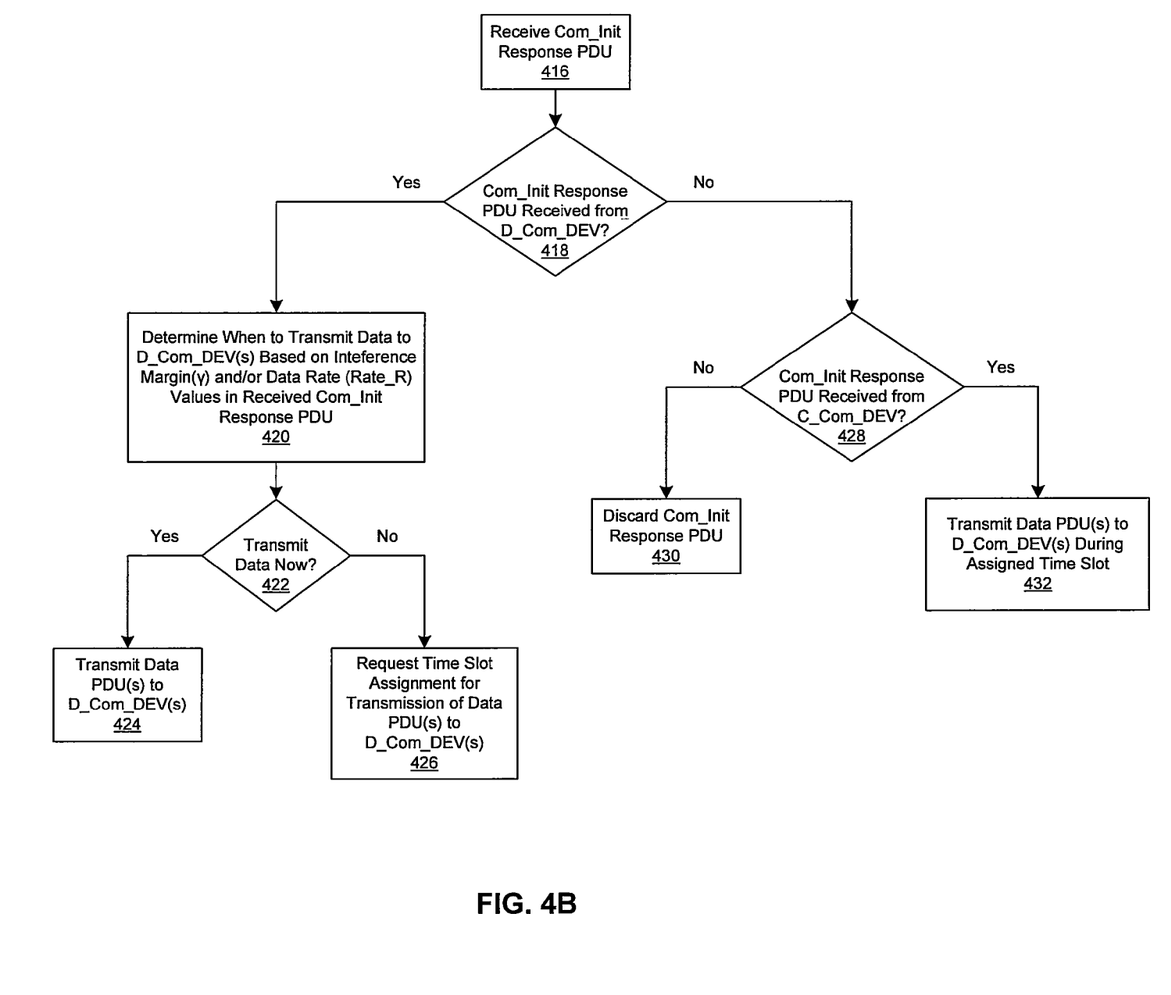
FIG. 4B is a flowchart that illustrates exemplary steps for an originating communicating device that attempts to transmit data to one or more destination communicating devices, in accordance with an embodiment of the invention.

FIG. 4B is a continuation of FIG. 4A. Referring to FIG. 4B, following step 414 (FIG. 4A), in step 416, the originating Com_DEV may receive a Com_Init response PDU. In a various embodiments of the invention, a Com_Init response PDU may comprise a CTS frame and/or an acknowledgment (ACK) frame. Referring to FIG. 1, in an exemplary embodiment of the invention, the DEV 112 may send a CTS frame in response to an RTS frame previously transmitted by DEV 118. In another exemplary embodiment of the invention, the PNC 102 may send an ACK frame in response to an RTS frame previously transmitted by the DEV 118.

In step 418, the originating Com_DEV may determine whether the Com_Init response PDU was received from a D_Com_DEV. In instances when the Com_Init response PDU is received from a D_Com_DEV, in step 420, the originating Com_DEV may determine when to transmit data to the D_Com_DEV. In various embodiments of the invention, the originating Com_DEV may make the determination based on interference margin ($\gamma$) and/or data rate (Rate_R) values contained in received Com_Init response PDUs.

In step 422, the originating Com_DEV may determine whether to transmit data now. In instances when the originating Com_DEV determines that data may be transmitted now, in step 424, the originating Com_DEV may transmit one or more data (or other type) PDUs to the D_Com_DEV(s). In various embodiments of the invention, the originating Com_DEV may transmit the PDUs during a current contention access period.

In instances at step 422, in which the originating Com_DEV determines that data may not be transmitted now, in step 426, the originating Com_DEV may request a time slot assignment for transmission of PDUs to the D_Com_DEV(s).

In instances at step 418, in which the Com_Init response PDU is not received from a D_Com_DEV, in step 428, the originating Com_DEV may determine whether the Com_Init response PDU is received from a C_Com_DEV. In instances when the Com_Init response PDU is not received from the C_Com_DEV, in step 430, the Com_Init response PDU may be discarded. In instances at step 428, in which the Com_Init response PDU is received from the C_Com_DEV, in step 432, the originating Com_DEV may transmit PDUs to the D_Com_DEV(s) during an assigned time slot. In various embodiments of the invention, the time slot assignment may be communicated to the originating Com_DEV in the Com_Init response PDU received from the C_Com_DEV.

Figure 5:
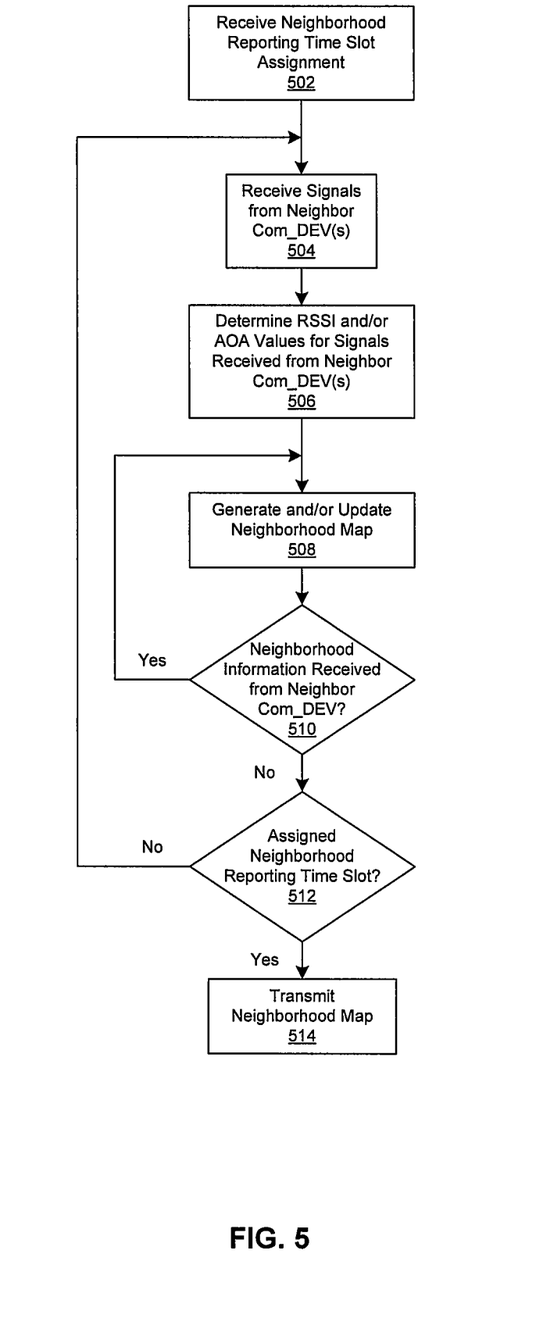
FIG. 5 is a flowchart that illustrates exemplary steps for computing a neighborhood map at a communicating device within a network, in accordance with an embodiment of the invention.

FIG. 5 is a flowchart that illustrates exemplary steps for computing a neighborhood map at a communicating device within a network, in accordance with an embodiment of the invention. With reference to FIG. 1, FIG. 5 illustrates an exemplary process of neighborhood map generation and/or update, which may be practiced at any the DEVs 112, 114, 116, 118, 120 and/or the PNC 102. Referring to FIG. 5, in step 502, a communicating device (Com_DEV) may receive a neighborhood reporting time slot assignment. With reference to FIG. 2, in various embodiments of the invention, a time slot assignment may be any NRT time slot 212, 214, . . . , and 216. In various embodiments of the invention, the neighborhood reporting time slot assignment may be generated by a coordinating communication device (C_Com_DEV). With reference to FIG. 1, an exemplary C_Com_DEV is PNC 102.

In step 504, the Com_DEV may receive signals from neighbor Com_DEV(s). Referring to FIG. 1, the DEV 112 may receive signals from neighbor the DEV 114, the DEV 118, the DEV 120 and/or the PNC 102. In step 506, the Com_DEV may determine RSSI and/or AOA values for signals received from the neighbor Com_DEV(s). In step 508, the Com_DEV may generate and/or update a neighborhood map based on the received signals. The neighborhood map may indicate RSSI and/or AOA values for each neighboring Com_DEV from which signals were received.

In step 510, the Com_DEV may determine whether neighborhood information has been received from one or more neighbor Com_DEV(s). In instances when neighborhood information is received from one or more neighbor Com_DEV(s), in step 508, the Com_DEV may update its neighborhood map. In instances, in step 510, in which neighborhood information is not received from a neighbor Com_DEV, in step 512, the Com_DEV may determine whether a current time instant corresponds to an assigned NRT time slot. In instances when the current time instant corresponds to an assigned NRT time slot, in step 514, the Com_DEV may transmit its current neighborhood map. In instances, in step 512, in which the current time instant does not correspond to an assigned NRT time slot, step 504 may follow step 512.

Figure 6:
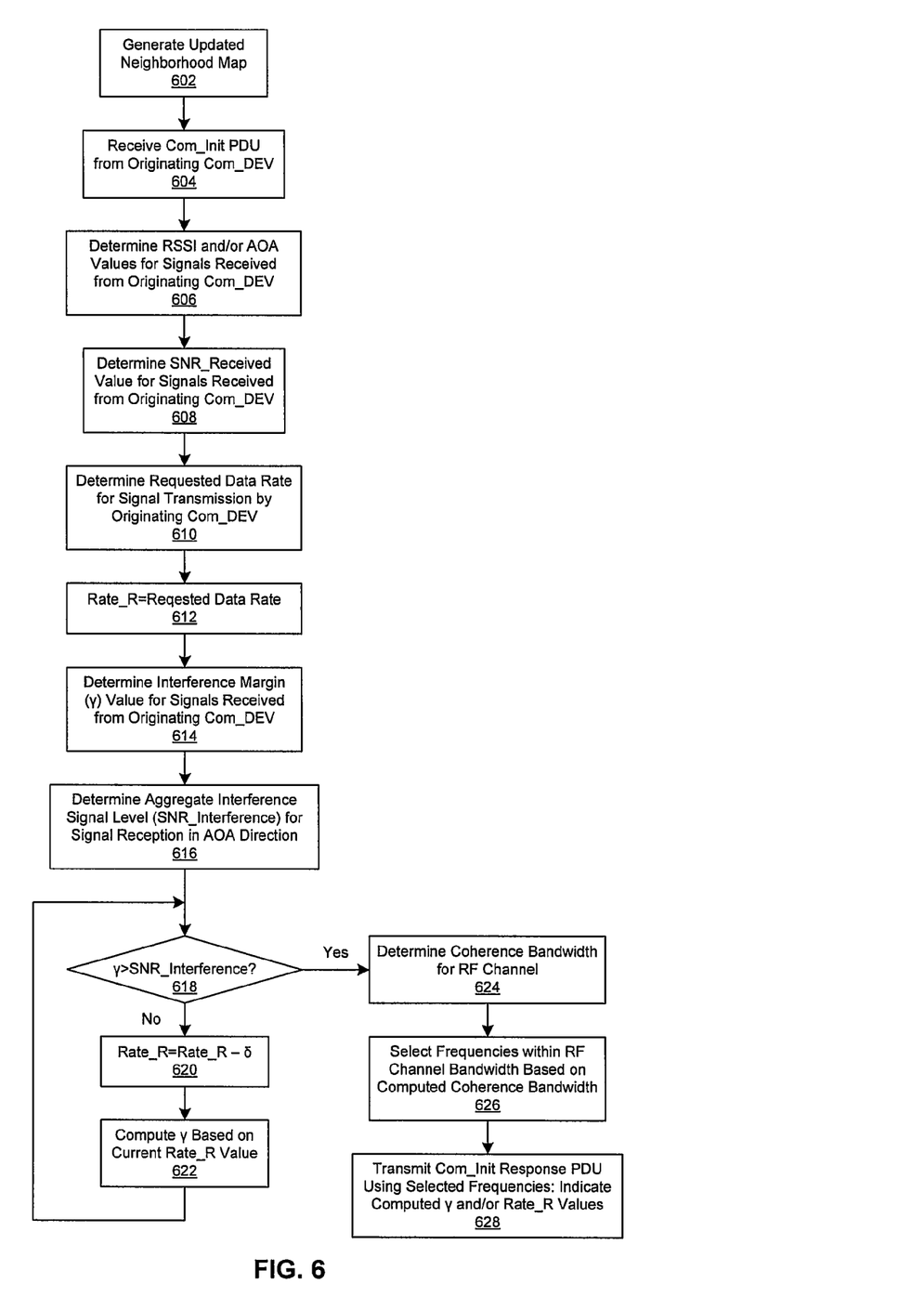
FIG. 6 is a flowchart that illustrates exemplary steps for computing an interference margin for transmission of signals within a network, in accordance with an embodiment of the invention.

FIG. 6 is a flowchart that illustrates exemplary steps for computing an interference margin for transmission of signals within a network, in accordance with an embodiment of the invention. In various embodiments of the invention, a Com_DEV, which receives a communication initiation PDU from an originating Com_DEV may compute an interference margin for signals transmitted by the originating Com_DEV. Referring to FIG. 6, in step 602, the Com_DEV may generate an updated neighborhood map. The neighborhood map may be generated and/or updated substantially as described in FIG. 5. In step 604, the Com_DEV may receive a Com_Init PDU from an originating Com_DEV. In various embodiments of the invention, the Com_Init PDU may comprise an RTS frame. In step 606, the Com_DEV may determine RSSI and/or AOA values for signals received from the originating Com_DEV.

In step 608, the Com_DEV may determine an $SNR_{Received}$ value for signals received from the originating Com_DEV. In various embodiments of the invention, the $SNR_{Received}$ value may be determined based on the RSSI value. In step 610, the Com_DEV may determine the requested data rate from signal transmission by the originating Com_DEV. The requested data rate may be determined based on the received Com_Init PDU.

In step 612, an initial Rate_R value may be set equal to the requested data rate. In step 614, the Com_DEV may determine an interference margin ($\gamma$) value for signals received from the originating Com_DEV. In step 616, the Com_DEV may determine an aggregate interference signal level ($SNR_{Interference}$) for signal reception in the AOA direction.

In step 618, the Com_DEV may determine whether the value of $\gamma$ is greater than the value of $SNR_{Interference}$. In instances in which $\gamma \leq SNR_{Interference}$, in step 620, the current value Rate_R may be decremented by a value $\delta$, where $\delta$ represents a rate decrement value. In step 622, a new value $\gamma$ be computed based on the current Rate_R value. Step 618 may follow step 622.

In instances at step 618, in which $\gamma > SNR_{Interference}$, in step 624, the Com_DEV may determine the coherence bandwidth for the RF channel between the Com_DEV and the originating Com_DEV. In step 626, the Com_DEV may select frequencies with an RF channel bandwidth based on the computed coherence bandwidth. In step 628, the Com_DEV may transmit a Com_Init response PDU. In various embodiments of the invention, an exemplary Com_Init response PDU comprises a CTS frame. The Com_DEV may utilize the selected frequencies to transmit the Com_Init response PDU. The Com_Init response PDU may indicate computed values for $\gamma$ and/or for Rate_R.

Figure 7:
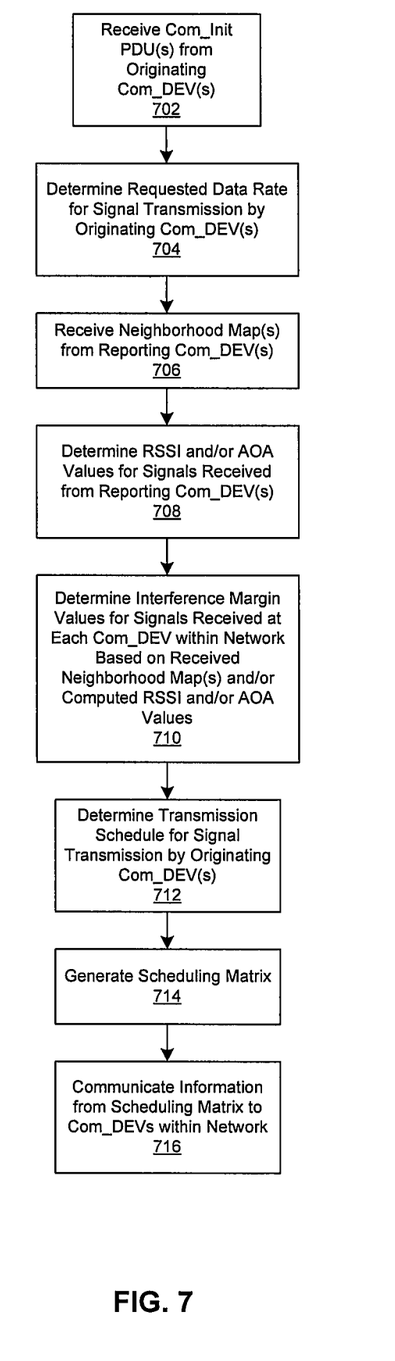
FIG. 7 is a flowchart that illustrates exemplary steps for computing a scheduling matrix for transmission of signals within a network, in accordance with an embodiment of the invention.

FIG. 7 is a flowchart that illustrates exemplary steps for computing a scheduling matrix for transmission of signals within a network, in accordance with an embodiment of the invention. In various embodiments of the invention, a scheduling matrix may be computed at a coordinating communicating device (C_Com_DEV) based on neighborhood information received from communicating devices (Com_DEVs) associated with the C_Com_DEV in a network. Referring to FIG. 1, in an exemplary embodiment of the invention, a PNC 102 may compute a scheduling matrix based on neighborhood information received from the DEVs 112, 114, 116, 118 and/or 120. In various embodiments of the invention, a computed scheduling matrix may enable a plurality of DEVs to communicate concurrently during a CTA time slot.

Referring to FIG. 7, in step 702, a C_Com_DEV may receive one or more Com_Init PDU(s) from one or more originating Com_DEV(s). In an exemplary embodiment of the invention, the Com_Init PDU(s) may comprise RTS frames transmitted during a contention access period (CAP). One or more RTS frames may comprise a time slot assignment request in which the originating Com_DEV requests a CTA time slot assignment during the CTA period.

In step 704, the C_Com_DEV may determine a requested data rate for signal transmission by the originating Com_DEV(s). In step 706, the C_Com_DEV may receive neighborhood map(s) from reporting Com_DEV(s). In step 708, the C_COM_DEV may determine RSSI and/or AOA values for signals received from reporting Com_DEV(s). In step 710, the C_Com_DEV may determine interference margin ($\gamma$) values for signals received at each Com_DEV within a network. The $\gamma$ values may be determined based on received neighborhood map(s) and/or RSSI and/or AOA values computed by the C_Com_DEV. With reference to FIG. 1, in an exemplary embodiment of the invention, a PNC 102 may receive neighborhood maps from DEVs 112, 114, 116, 118 and/or 120 within a piconet network. Based on these received neighborhood maps, the PNC 102 may compute interference margins for signals received each DEV. For example, the PNC 102 may compute an interference margin value for signals received by the DEV 112 that are transmitted from the DEV 114, the DEV 118 and the DEV 120 respectively.

In step 712, the C_Com_DEV may determine a transmission schedule for signal transmissions by the originating Com_DEV(s), which have requested time slot assignments. In various embodiments of the invention, the transmission schedule may enable a plurality of originating Com_DEV(s) to concurrently transmit signals during a given time slot. In step 714, the C_Com_DEV may generate a scheduling matrix based on the transmission schedule. In step 716, the C_Com_DEV may communicate information from the scheduling matrix to Com_DEVs within the network. In an exemplary embodiment of the invention, the C_Com_DEV may communicate to each Com_DEV its corresponding time slot assignment. In various embodiments of the invention, the C_Com_DEV may communicate at least a portion of the scheduling matrix to each Com_DEV within the network.

Another embodiment of the invention may provide a machine and/or computer readable medium, having stored thereon, a computer program having at least one code section executable by a machine and/or computer, thereby causing the machine and/or computer to perform the steps as described herein for scheduling multiple concurrent transmissions during a contention access period in a wireless communications network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

Aspects of a computer readable medium having stored thereon, a computer program having at least one code section for processing signals in a communication system, the at least one code section being executable by a computer for causing the machine to perform steps for scheduling multiple concurrent transmissions during a contention access period in a wireless communications network.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for communicating data, the system comprising:
   circuitry operable to:
   determine a direction of transmission of a radio frequency signal for each of a plurality of communication devices based on signals received from said plurality of communication devices, the direction of transmission for said each of said plurality of communication devices is determined based at least on an angle of arrival of said received signals;
   assign neighbor reporting time slots to said plurality of communication devices;
   receive neighborhood information from said each of said plurality of communication devices during a corresponding neighbor reporting time slot;
   generate a scheduling matrix based on said determined direction of transmission for said each of said plurality of communication devices;
   assign signal transmission time slots from a plurality of signal transmission time slots to said plurality of communication devices based on said generated scheduling matrix and said received neighborhood information, wherein one or more of said assigned signal transmission time slots is assigned to said plurality of communication devices; and
   selectively adjust a data rate to be utilized by said each of said plurality of communication devices to communicate during respective assigned signal transmission time slots based on a computed interference level corresponding to said each of said plurality of communication devices, said interference level being computed based on said signals received from said each of said plurality of communication devices.

2. The system according to claim 1, wherein said circuitry is operable to compute a received signal strength indication for said each of said plurality of communication devices based on said received signals from said plurality of communication devices.

3. The system according to claim 2, wherein said circuitry is operable to receive said neighborhood information for said each of said plurality of communication devices via said received signals from said plurality of communication devices.

4. The system according to claim 3, wherein said circuitry is operable to determine neighboring communication devices to said each of said plurality of communication devices based on said received neighborhood information.

5. The system according to claim 4, wherein said circuitry is operable to compute one or more interference margins for said each of said plurality of communication devices based on one or more of said computed received signal strength indication for said each of said plurality of communication devices, said angle of arrival for said each of said plurality of communication devices, and said received neighborhood information for said each of said plurality of communication devices.

6. The system according to claim 5, wherein each of said computed one or more interference margins for a selected one of said plurality of communication devices corresponds to signals received at said selected one of said plurality of communication devices from a corresponding one of said determined neighboring communication devices.

7. The system according to claim 6, wherein said each of said one or more interference margins is computed based on one or both of a computed signal to noise ratio for said signals received from said corresponding one of said determined neighboring communication devices, and a selected data rate for said signals transmitted by said corresponding one of said determined neighboring communication devices to said selected one of said plurality of communication devices.

8. The system according to claim 1, wherein said circuitry is operable to communicate at least a portion of said generated scheduling matrix to at least a portion of said plurality of communication devices in response to one or more time slot allocation requests received via said signals from one or more of said plurality of communication devices.

9. The system according to claim 8, wherein said one or more time slot allocation requests are received via one or more communication initiation protocol data units.

10. The system of claim 1, wherein said circuitry is operable to determine a location for said each of said plurality of communication devices based on said signals received from said plurality of communication devices, the location for said each of said plurality of communication devices determined based at least on the angle of arrival of said received signals, wherein said scheduling matrix is generated further based upon said determined location for said each of said plurality of communication devices.

11. A method for communicating data, the method comprising:
   determining a direction of transmission of a radio frequency signal for each of a plurality of communication devices based on signals received from said plurality of communication devices, the direction of transmission for said each of said plurality of communication devices being based at least on an angle of arrival of said received signals;
   assigning neighbor reporting time slots to said plurality of communication devices;
   receiving neighborhood information from said each of said plurality of communication devices during a corresponding neighbor reporting time slot;
   generating a scheduling matrix based on said determined direction of transmission for said each of said plurality of communication devices;
   assigning signal transmission time slots from a plurality of signal transmission time slots to said plurality of communication devices based on said generated scheduling matrix and said received neighborhood information, wherein one or more of said assigned signal transmission time slots is assigned to said plurality of communication devices; and selectively adjusting a data rate to be utilized by said each of said plurality of communication devices to communicate during respective assigned signal transmission time slots based on a computed interference level corresponding to said each of said plurality of communication devices, said interference level being computed based on said signals received from said each of said plurality of communication devices.

12. The method according to claim 11, comprising computing a received signal strength indication for said each of said plurality of communication devices based on said received signals from said plurality of communication devices.

13. The method according to claim 12, comprising receiving said neighborhood information for said each of said plurality of communication devices via said received signals from said plurality of communication devices.

14. The method according to claim 13, comprising determining neighboring communication devices to said each of said plurality of communication devices based on said received neighborhood information.

15. The method according to claim 14, comprising computing one or more interference margins for said each of said plurality of communication devices based on one or more of said computed received signal strength indication for said each of said plurality of communication devices, said angle of arrival for said each of said plurality of communication devices, and said received neighborhood information for said each of said plurality of communication devices.

16. The method according to claim 15, wherein each of said computed one or more interference margins for a selected one of said plurality of communication devices corresponds to signals received at said selected one of said plurality of communication devices from a corresponding one of said determined neighboring communication devices.

17. The method according to claim 16, wherein said each of said one or more interference margins is computed based on one or both of a computed signal to noise ratio for said signals received from said corresponding one of said determined neighboring communication devices, and a selected data rate for said signals transmitted by said corresponding one of said determined neighboring communication devices to said selected one of said plurality of communication devices.

18. The method according to claim 11, comprising communicating at least a portion of said generated scheduling matrix to at least a portion of said plurality of communication devices in response to one or more time slot allocation requests received via said signals from one or more of said plurality of communication devices.

19. The method according to claim 18, wherein said one or more time slot allocation requests are received via one or more communication initiation protocol data units.

20. The method of claim 11, further comprising
determining a location for said each of said plurality of communication devices based on said signals received from said plurality of communication devices, the location for said each of said plurality of communication devices determined based at least on the angle of arrival of said received signals, wherein said scheduling matrix is generated further based upon said determined location for said each of said plurality of communication devices.

21. A system, comprising:
means for determining a direction of transmission of a radio frequency signal for each of a plurality of communication devices based on signals received from said plurality of communication devices, the direction of transmission for said each of said plurality of communication devices being based at least on an angle of arrival of said received signals;
means for assigning neighbor reporting time slots to said plurality of communication devices;
means for receiving neighborhood information from said each of said plurality of communication devices during a corresponding neighbor reporting time slot;
means for generating a scheduling matrix based on said determined direction of transmission for said each of said plurality of communication devices;
means for assigning signal transmission time slots from a plurality of signal transmission time slots to said plurality of communication devices based on said generated scheduling matrix and said received neighborhood information, wherein one or more of said assigned signal transmission time slots is assigned to said plurality of communication devices; and
means for selectively adjusting a data rate to be utilized by said each of said plurality of communication devices to communicate during respective assigned signal transmission time slots based on a computed interference level corresponding to said each of said plurality of communication devices, said interference level being computed based on said signals received from said each of said plurality of communication devices.

* * * * *